UNITED STATES PATENT OFFICE.

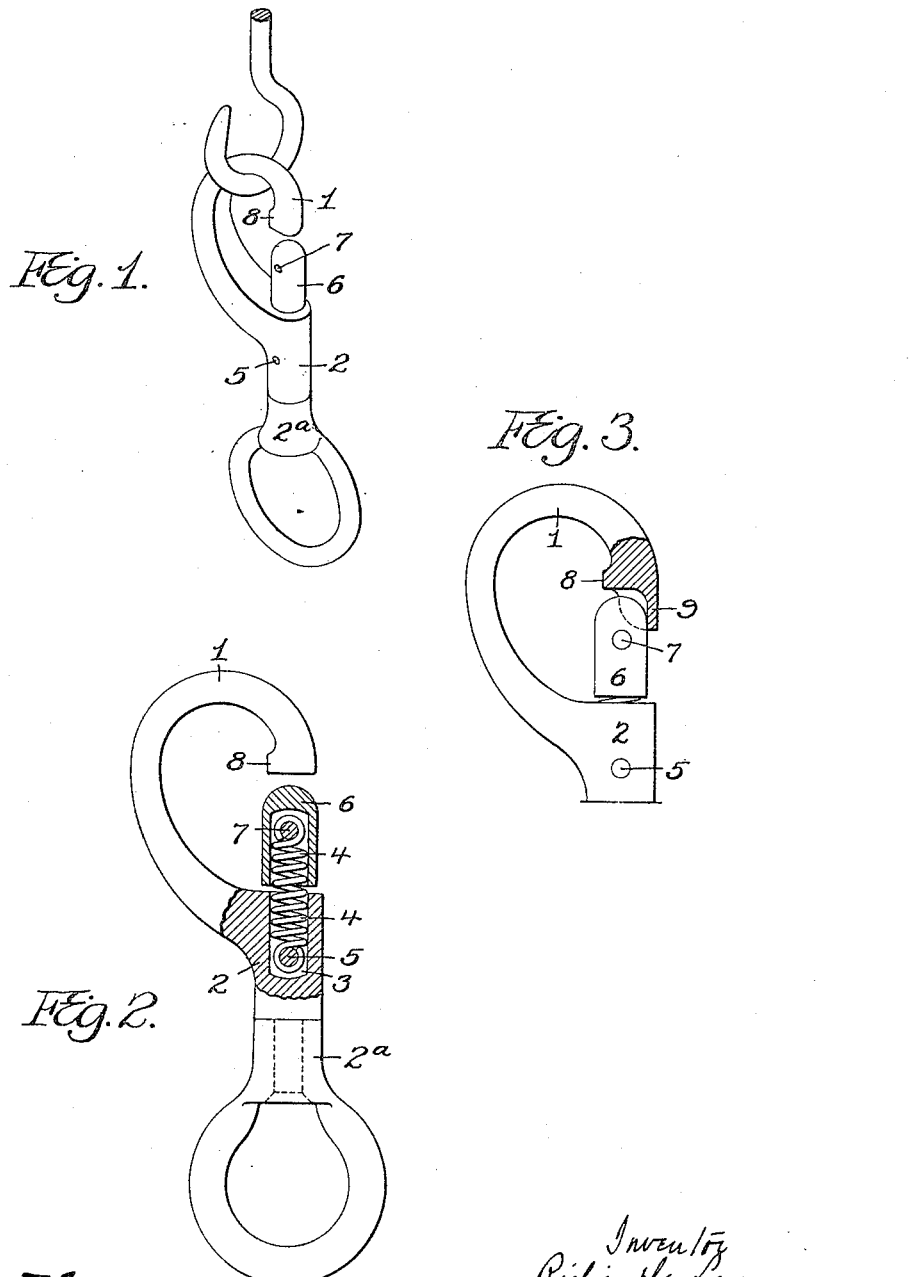

RICHIE DE LAN, OF PHILADELPHIA, PENNSYLVANIA.

SNAP-HOOK.

1,133,842.  Specification of Letters Patent. Patented Mar. 30, 1915.

Application filed July 11, 1913. Serial No. 778,449.

*To all whom it may concern:*

Be it known that I, RICHIE DE LAN, a citizen of the United States, residing in Philadelphia, Pennsylvania, have invented certain Improvements in Snap-Hooks, of which the following is a specification.

My invention relates to that class of snap hooks in which the latch is free to move in all directions, the objects of my invention being to provide a more durable hook of this type than those previously devised and to increase the resiliency of the latch. These objects I attain in the manner hereinafter set forth, reference being had to the accompanying drawing, in which—

Figure 1 is a perspective view of a snap hook constructed in accordance with my invention; Fig. 2 is a view of the same partly in side elevation and partly in section, and Fig. 3 is a view illustrating a special construction of part of the hook.

In the drawing, 1 represents the hook proper which springs from the shank 2, the latter having at the end opposite that which carries the hook a swivel shackle 2ª as usual. The shank 2 of the hook has a longitudinal opening 3 formed therein for the reception of part of a coiled spring 4, whose inner end is secured to the shank 2 by means of a transverse pin 5 or other suitable device. The spring 4 projects outwardly beyond the shank 2 and is provided with a cap 6 which incloses said projecting portion of the spring and is secured to the outer end of the same by means of a transverse pin 7, or equivalent means. The cap 6 practically fills the space between the end of the hook 1 and the top of the shank 2 and therefore constitutes the latch of the hook, this latch being free to swing in any direction, thus permitting the application or removal of the engaging hook from any side. The hook 1 has at the end an inwardly projecting lug 8 which serves to arrest the movement of an engaging hook in the direction of the point of the latch 6 and thus tends to prevent accidental unlatching of said engaging hook.

By the use of the coiled metal spring secured at one end to a recess in the end of the shank of the hook and carrying at its opposite end a cap which incloses the projecting portion of the spring, the resiliency of the spring from end to end is available, and consequently the spring is not subjected to excessive strain at the point where it emerges from the shank of the hook and the latch formed by the capped portion of the spring is practically as durable as any other portion of the hook.

If it is desired to prevent the outward swing of the latch 6 such result may be readily accomplished by providing the point of the hook with a projecting shoulder, such for instance as shown at 9 in Fig. 3, for engaging with the top of the cap 6.

I claim:

1. The combination, in a snap hook, of a shank having a longitudinal opening therein, a coiled metallic spring contained in said opening and projecting therefrom across the space between the shank and the point of the hook, the projecting portion of the spring having an inclosing cap and being free to swing laterally in order to open the hook, and that portion of the spring which is contained within the opening of the shank being free to move axially as the projecting portion of the spring moves laterally.

2. The combination, in a snap hook, of a shank having a longitudinal opening therein, a coiled metallic spring contained in said opening and projecting therefrom across the space between the shank and the point of the hook, a cap inclosing said projecting portion of the spring, and means for securing the opposite ends of the spring respectively to the said cap and to the shank of the hook, the projecting portion of the spring and its cap being free to swing laterally in order to open the hook, and that portion of the spring which is contained within the opening of the shank being free to move axially as the projecting portion of the spring is moved laterally.

In testimony whereof I have signed my name to this specification in the presence of two subscribing witnesses.

RICHIE DE LAN.

Witnesses:
KATE A. BEADLE,
HAMILTON D. TURNER.

Copies of this patent may be obtained for five cents each, by addressing the "Commissioner of Patents, Washington, D. C."